D. McNEILL.
APPARATUS FOR INDICATING SPEED.
APPLICATION FILED JAN. 19, 1916.
1,227,283.
Patented May 22, 1917.
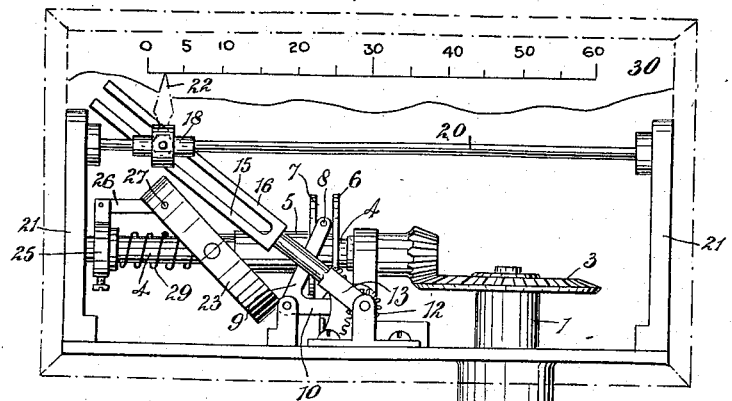
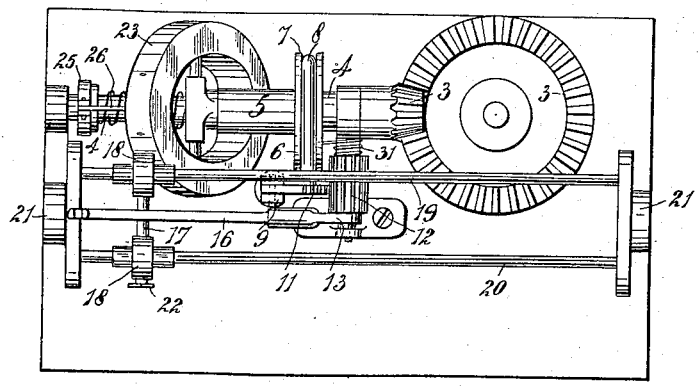
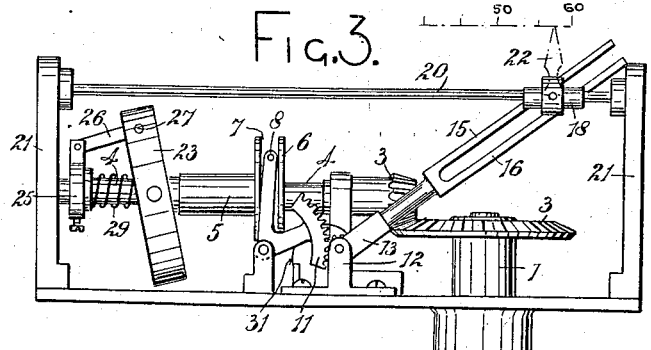
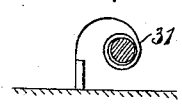
INVENTOR:
David McNeill
BY
Wm Wallace White
ATTORNEY

UNITED STATES PATENT OFFICE.

DAVID McNEILL, OF WATFORD, ENGLAND, ASSIGNOR OF ONE-FOURTH TO HARRY GEORGE SHORING, OF CRICKLEWOOD, ENGLAND; ONE-FOURTH TO GEORGE LEONARD WATERFIELD AND ONE-FOURTH TO THOMAS WATERFIELD, OF HIGHGATE, ENGLAND.

APPARATUS FOR INDICATING SPEED.

1,227,283.

Specification of Letters Patent.

Patented May 22, 1917.

Application filed January 19, 1916. Serial No. 73,038.

*To all whom it may concern:*

Be it known that I, DAVID McNEILL, a subject of Great Britain and Ireland, residing at Watford, in the county of Hertford, England, have invented new and useful Improvements in Apparatus for Indicating the Speed of Motor-Cars and other Vehicles, of which the following is a specification.

This invention has reference to apparatus for indicating the speed of motor cars and other vehicles of the type wherein a centrifugal member on a rotating shaft controls the movement of a sleeve which through suitable mechanism actuates a pointer along a horizontal or vertical rod or other supporting device and is also applicable for indicating the number of revolutions made by a shaft in a given time. The objects of my invention are to enable the reading of the dial to be more readily made in a horizontal direction; to provide an indicating device more sensitive to variation in the speed of the vehicle, or shaft; to reduce the number of the working parts, and thereby the friction; to obviate vibration in the indicator hand, and to render the apparatus more compact, durable, and less costly in its construction than heretofore.

For this purpose mechanism is provided comprising, as heretofore, a spindle coupled up to the shaft of the vehicle, along which spindle a sleeve is capable of endwise movement when motion is imparted to it by the centrifugal movement of a body to which it is connected, such body being coupled up to the spindle and revolving therewith.

Heretofore it has been well known to provide mechanism, comprising a spindle, coupled up to the driving shaft, along which spindle slides a sleeve capable of endwise movement when motion is imparted to it by the centrifugal action of a body to which it is connected, such body being coupled up to the spindle and revolving therewith, and I do not intend that such should be considered as in any way forming part of my invention, which as stated above, has for its objects the provision of improved means, or appliances, whereby the indicating device will operate in a horizontal direction; will be rendered more sensitive to any variation in the speed of the vehicle, or shaft; to reduce the number of working parts and thereby the friction; to obviate vibration in the indicating hand, and to render the apparatus more compact, durable, and less costly in its construction than heretofore.

Apparatus constructed according to my invention is illustrated in the accompanying drawings, in which:—

Figure 1 is a front elevation with the dial plate removed, showing the mechanism in a state of rest.

Fig. 2 is a plan view of same.

Fig. 3 is a similar view to Fig. 1, showing the position of the mechanism when the vehicle is traveling at the highest rate of speed to which the indicator is set.

Fig. 4 is a view to an enlarged scale showing an auxiliary spring arrangement, which assists in bringing the indicator hand back to zero when the car is traveling at the lowest rate of speed upon the dial plate, or when the car is at rest.

The main bearing (1) is coupled up in any well known manner to the driving shaft of the car and which through suitable reducing gear (3) imparts motion to the spindle (4) along which slides the sleeve (5) having at one end thereof a disk (6) channeled upon its outer periphery (7), within which channel is the bent arm (8) of a lever (9) whose other arm (10) has upon its end a quadrant (11) the teeth of which take into and operate a pinion (12) which transmits motion through a forked lever (13) fixed to the axis of the pinion (12). The two forked arms 15—16 of the lever (13) engage with the transverse rod (17) of a slide (18) which has two bearing surfaces capable of horizontal movement on two rods or bars 19—20, supported by standards 21—21, or which may be connected directly to the sides of the casing of the apparatus. One of the slides (18) traversing the horizontal bars 19—20 has attached to it a suitable indicating hand (22) which moves over the face of the dial through a longitudinal slot therein. The centrifugal moving body 23 is connected to and supported by one end of the sleeve (5), but its axle does not, as heretofore, pass through, nor is directly connected to, the operating spindle (4) the motion of which is imparted to it through a collar (25) fixed to the spindle (4) and a connecting link (26) which is attached at, or near to, the outer rim (27) of the centrifugal body (23). This arrangement renders the device more sensitive to the slightest variation in the speed of the mechanism hitherto than if the centrifugal body were directly connected to the driving spindle (4) and therefore enables the indicator hand to show more accurately on the dial plate the actual speed of the car. Around the spindle (4) and situate between the collar 25 and the centrifugal moving body (23) is a spring (29), the action of which is to keep the sleeve (24) carrying the centrifugal body (23) in a position in which the said body will lie in an oblique plane relatively to the axis of the operating spindle (4). The dial plate (30) of the indicator must be calibrated to accord with the strength of the spring 29. 31 is the auxiliary spring, whereby the indicator hand is assisted in being brought back to zero when the car is traveling at the lowest rate of speed to which the dial is set, or when the car is at rest.

One end of the spring is secured to the base of the casing of the apparatus, its other end being secured to the spindle of the pinion 12. When the pinion 12 is turned by the quadrant 11 while the indicator hand is being moved from zero to a higher rate of speed on the dial the spring 31 is being wound upon the spindle, the unwinding thereof assisting the movement of the forked lever 13 when it is traveling in the opposite direction.

It will be readily understood that by causing the supporting rods or bars 19, 20, to assume a circular or semi-circular form a dial plate, circular or semi-circular may be used with indicating apparatus of the kind hereinbefore described and that the form of the operating fork may be variously constructed, as for example, by causing a rod, instead of a fork to engage in a slot within the slide 18, without departing from the spirit of my invention.

I claim:

1. In a speed indicating apparatus of the class described, a dial plate having a rectilinear scale, a slide mounted for rectilinear movement in a path parallel to the dial scale, an indicating hand carried by the slide and adapted to traverse the scale, a lever having sliding connection with the slide, a spindle, and speed-controlled means for transmitting motion from the spindle to the said lever.

2. In a speed indicating apparatus of the class described, a rotary spindle, a sleeve slidably mounted on the said spindle, a centrifugal governing body supported by the sleeve and having its medial portion connected directly thereto, means for connecting the governing body at its periphery with the spindle for rotation therewith, an indicator, and means actuated by axial displacement of the sleeve on the spindle for transmitting motion to the indicator.

3. In a speed indicating apparatus of the class described, a rotary spindle, a sleeve slidably mounted on the said spindle, a centrifugal governing body supported by the sleeve and having its medial portion connected directly thereto, means for connecting the governing body at its periphery with the spindle for rotation therewith, an indicator, and speed-multiplying means actuated by axial displacement of the sleeve on the spindle for transmitting motion to the indicator.

4. In a speed indicating apparatus of the class described, a rotary spindle, a sleeve slidably mounted on the said spindle, a centrifugal governing body supported by the sleeve and having its medial portion connected directly thereto, a link connecting the governing body at its periphery with the spindle for rotation therewith, an indicator, and means actuated by axial displacement of the sleeve on the spindle for transmitting motion to the indicator.

In testimony whereof I have signed my name to this specification in the presence of two subscribing witnesses.

DAVID McNEILL.

Witnesses:
JAMES G. STOKES,
FLORENCE E. HEINGER.

Copies of this patent may be obtained for five cents each, by addressing the "Commissioner of Patents, Washington, D. C."